(12) United States Patent
Muser et al.

(10) Patent No.: US 8,095,886 B2
(45) Date of Patent: Jan. 10, 2012

(54) CONTEXT BASED NAVIGATION

(75) Inventors: Marino Muser, Rochester Hills, MI (US); Michael L. Morgenstein, Bloomfield Hills, MI (US); Francois Perroux, Chaville (FR)

(73) Assignee: Dassault Systemes DELMIA Corp., Auburn Hills, MI (US)

( * ) Notice: Subject to any disclaimer, the term of this patent is extended or adjusted under 35 U.S.C. 154(b) by 821 days.

(21) Appl. No.: 12/189,312

(22) Filed: Aug. 11, 2008

(65) Prior Publication Data
US 2010/0037174 A1 Feb. 11, 2010

(51) Int. Cl.
*G06F 3/00* (2006.01)
(52) U.S. Cl. ........ 715/781; 715/764; 715/835; 715/848; 715/850
(58) Field of Classification Search .................. 715/738, 715/781, 853–855
See application file for complete search history.

(56) References Cited

U.S. PATENT DOCUMENTS
5,945,976 A    8/1999  Iwamura et al.
2002/0033848 A1*  3/2002  Sciammarella et al. ...... 345/838
* cited by examiner

*Primary Examiner* — Xiomar L Bautista
(74) *Attorney, Agent, or Firm* — Hamilton, Brook, Smith & Reynolds, P.C.

(57) ABSTRACT

When navigating in a screen view composed of entities of differing types, a user may want to focus on any particular entity. Depending on the type of entity the user wants to focus on, the invention system adapts the screen view, as well as navigation behavior, to navigate the desired entity. This is accomplished without explicit action from the user like running a command and selecting the desired entity. Accordingly, a computer method and computer corresponding apparatus according to an embodiment of the present invention are provided to capture the user's intention to navigate the desired entity and to change the screen view and the navigation behavior. For example, when the user navigates an entity of a given type and the desired entity occupies a greater percentage of the screen view or becomes closer to the desired entity, the screen view and the navigation behavior change conveniently without explicit action from the user.

29 Claims, 16 Drawing Sheets

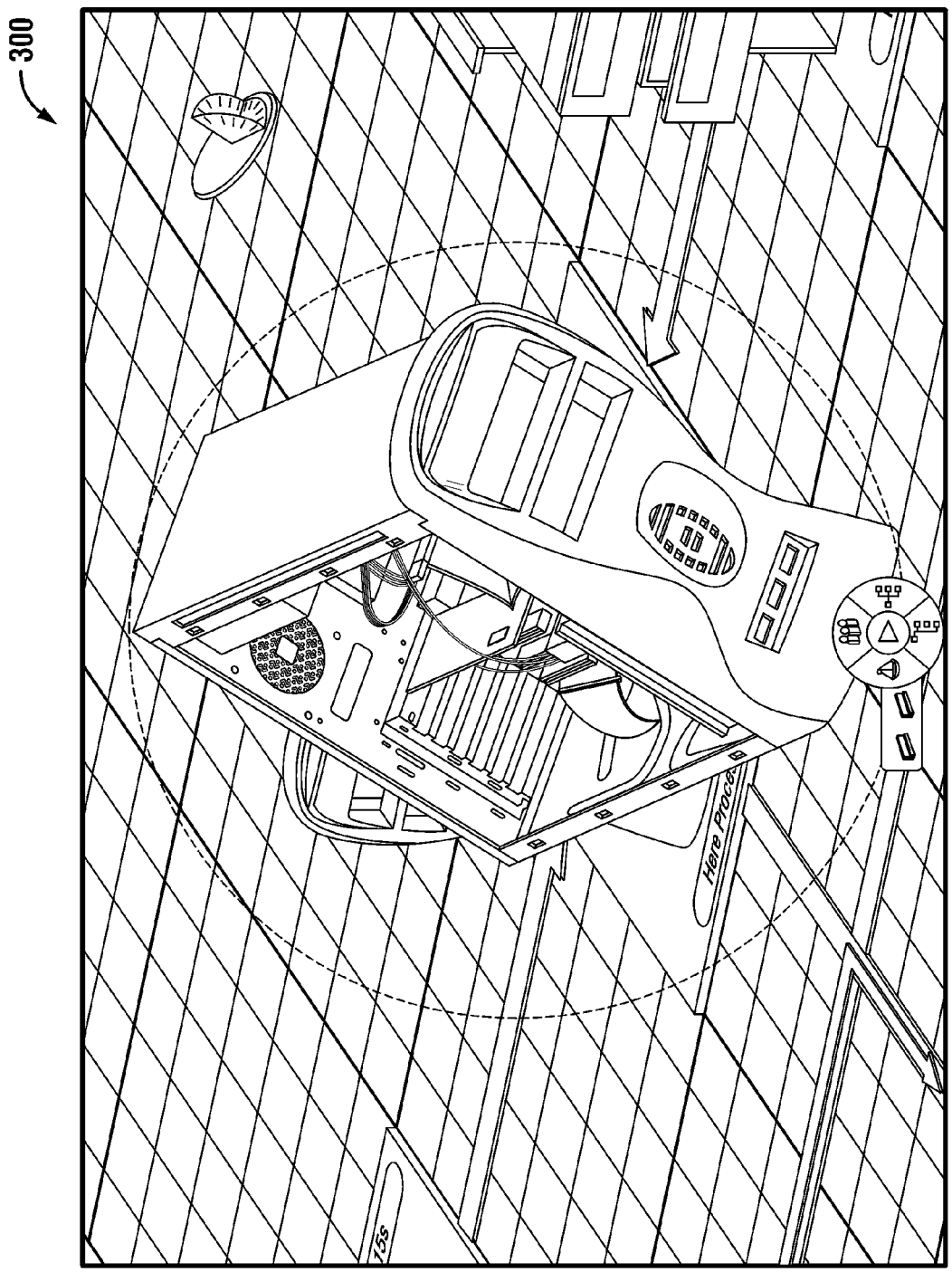

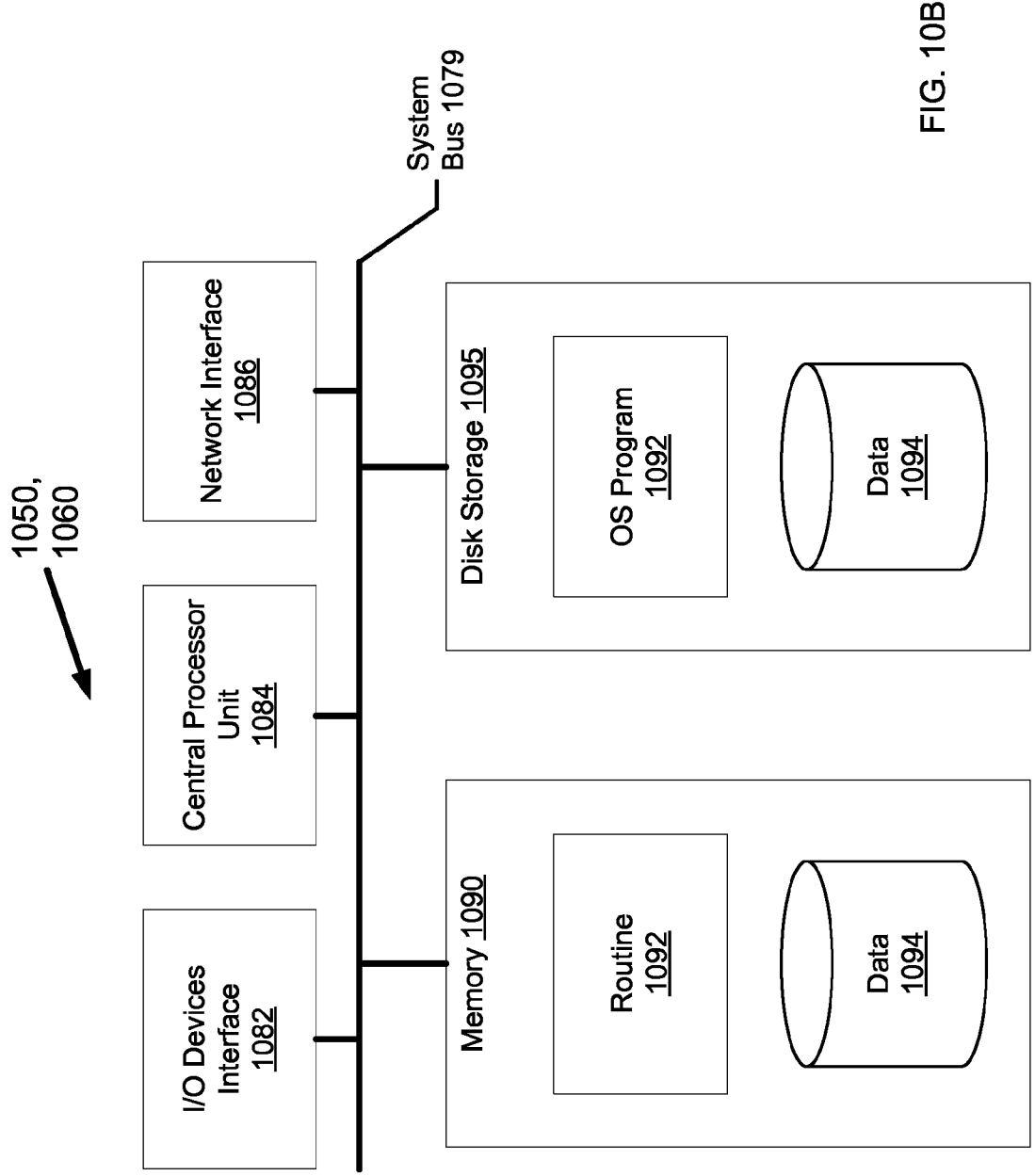

CONTEXT BASED NAVIGATION

BACKGROUND OF THE INVENTION

When navigating in a computer generated scene composed of entities of different entity types, a user may want to focus on any particular entity. Depending on the type of entity the user focuses on, the user typically desires the scene, as well as the navigation mechanism or behavior, to adapt to facilitate navigating an entity of interest. For example, the user would like to have all entities of the scene disappear except the entity of interest. The user would also like to be able to rotate around the entity of interest and be able to hide other entities that are in the way or otherwise hindering view, manipulation or navigation of the entity of interest.

A current implementation of the foregoing requires explicit action from the user like running a command and selecting the entity of interest. Such an implantation then opens another viewer or modifies the current viewer with the entity of interest and navigation behavior for navigating the entity of interest.

SUMMARY OF THE INVENTION

The present invention addresses the foregoing shortcomings and disadvantages of the prior art.

An example embodiment of the present invention may be implemented in the form of a method or corresponding apparatus for navigating a screen view of entities of differing entity types. The method and corresponding apparatus according to one embodiment of the present invention includes: (i) determining an intention to navigate a subject entity (i.e. determining focus of the end user) based on a percentage of the screen view occupied by the subject entity; and (ii) as a function of the determined intention (end-user focus), selecting a navigation mode with which to navigate the subject entity. The selected navigation mode identifies the subject entity and provides a navigation behavior for navigating the subject entity.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3A-3C are screenshots of navigating screen views of a planned process of a current context and a product entity of a subject context, in accordance with an embodiment of the present invention;

FIG. 10B is an example computer in the network of FIG. 10A implementing example embodiments of the present invention.

DETAILED DESCRIPTION OF THE INVENTION

A description of example embodiments of the invention follows.

When navigating a computer generated screen view made of entities of differing types, a user may want to focus on any one particular entity. Depending on the type of entity the user wants to focus on, it is desirous that the screen view, as well as a navigation mechanism or behavior, adapt to and facilitate navigating this entity. Consider the following example.

Figure 1:
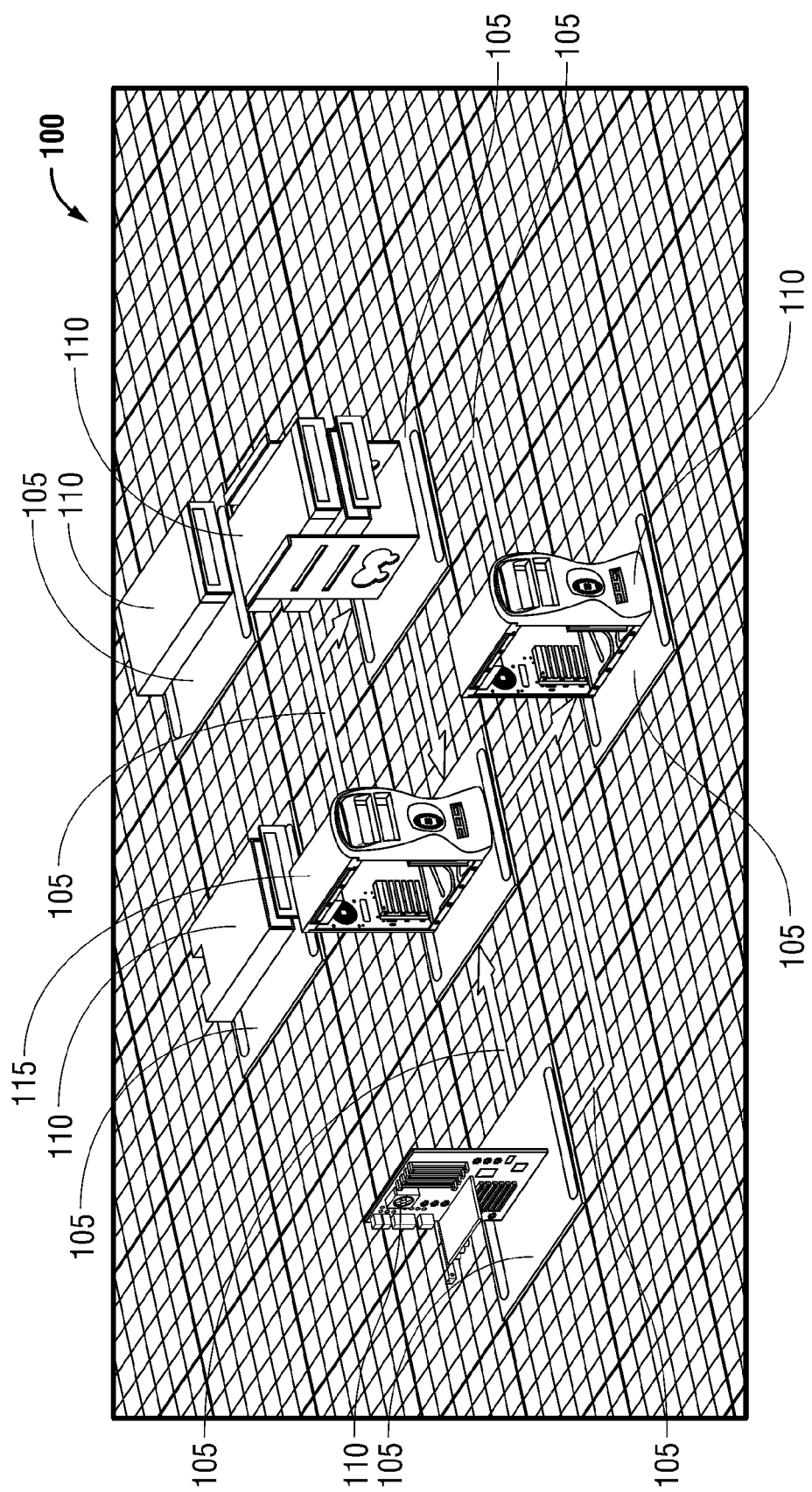
FIG. 1 is a screenshot of a screen view of a planned process with product entities and process entities which may be navigated, in accordance with embodiments of the present invention.

FIG. 1 is a screen view of a planned process 100 made up of process entities 105 and product entities 110, 115. The user may be interested in:

1. navigating the screen view of a planned process 100 to overview the process entities 105 and the product entities 110; or 2. navigating a certain one of the product entities, namely subject entity 115 to have a closer look.

Describing the latter interest further, to navigate the subject entity 115 the user would like the subject entity 115 to be identified, for example, by clearing the screen view of the planned process 100 of the process entities 105 and the other product entities 110. Also, to navigate the subject entity 115 the user would like a navigation behavior to be provided for navigating the subject entity 115, such as by rotating the subject entity 115 or by hiding an entity that interferes with or otherwise hinders navigating the subject entity 115. Together the entity as identified and the navigation behavior as provided make up a context in which to navigate, hereinafter, referred to as a "navigation mode."

It should be readily apparent that a single navigation mode of the prior art for navigating entities of differing types is ineffective and inadequate. Consider the following example.

Figure 2:
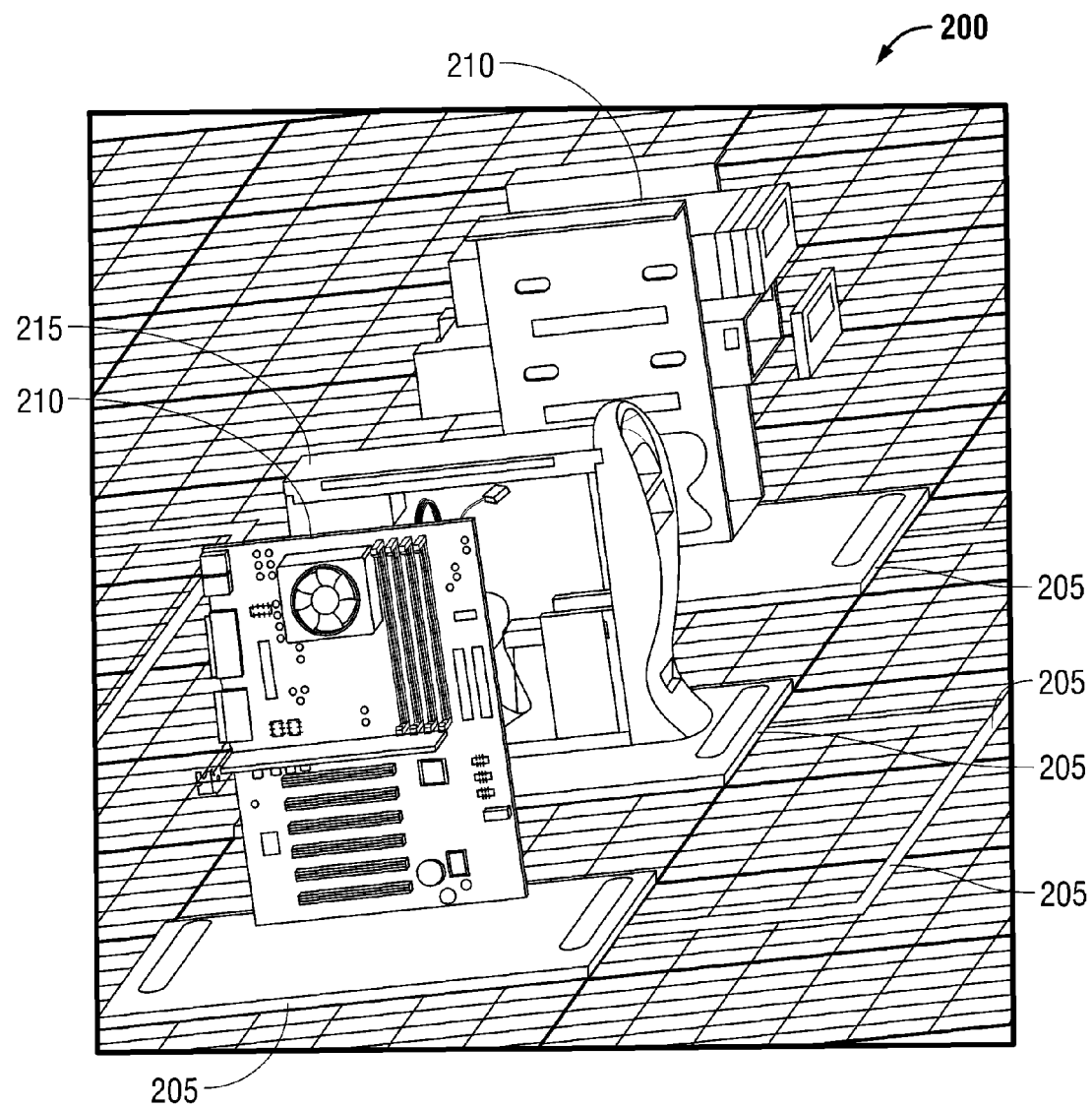
FIG. 2 is a screenshot of the screen view of a planned process with product entities and process entities which may be navigated, in accordance with embodiments of the present invention.

FIG. 2 illustrates a screen view of a planned process 200 having process entities 205 and product entities 210, 215. In this illustrated example, there is a single navigation mode for navigating the screen view of the planned process 200, and the included process entities 205 and product entities 210, 215. Consequently, despite a user wanting to navigate a subject entity 215, the screen view of the planned process 200 together with the process entities 205 and the other product entities 210 all rotate, for example, as the user rotates the subject entity 215. Contrary to the user's intention, a navigation behavior of the single navigation mode affects not just the subject entity 215, but also affects quite undesirably the process entities 205 and the other product entities 210. Additionally, the navigation behavior for rotating an entity and allowing the underside of the entity to be seen, while applicable or otherwise suited for navigating the product entities 210, 215, is not suited for navigating the process entities 205.

Further, despite the user wanting to navigate the subject entity 215 and no other, the screen view of the planned process 200 along with the process entities 205 and the other product entities 210 are all identified to be navigated (e.g. rotated, etc.) in addition to the subject entity 215. In the illustrated example, the product entity 210 is in the foreground and is in the way of navigating the subject entity 215.

To navigate a screen view of entities of differing entity types (each entity and/or entity type having a different navigation mode) effectively requires switching from one navigation mode to another navigation mode. Switching navigation modes may be done by explicit user action, such as running a command and selecting a subject entity. Doing so may open another viewer/window or modify the current viewer/window with the subject entity identified and navigation behavior provided. This technique, however, tasks a user with learning how to switch navigation modes and prevents "right out of the box" use. Furthermore, explicit user action requires multiple mouse clicks, keyboard strokes or other input to affect each and every context switch, thus demanding user time and increasing the susceptibility to user error.

Continuing with the illustrated example of FIG. 2, if the user does not explicitly switch navigation mode by running a command or pressing a key, there is no possible way to rotate the user's view point around the subject entity 215 without keeping the process entities 205 and the other product entities 210 out of the way. The entire screen view of the planned process 200, with the included process entities 205 and the other product entities 210, all rotate/zoom/scale with the subject entity 215 correspondingly. Consequently and counterproductively, the other entities are likely to block or otherwise obstruct a user view point of the subject entity 215. In this example, to navigate the subject entity 215, the user switches to a navigation mode for navigating the subject entity 215 by running a command. But as describe above, running such a command requires both user time to learn and user time to execute, and is prone to user errors.

Figure 3A:
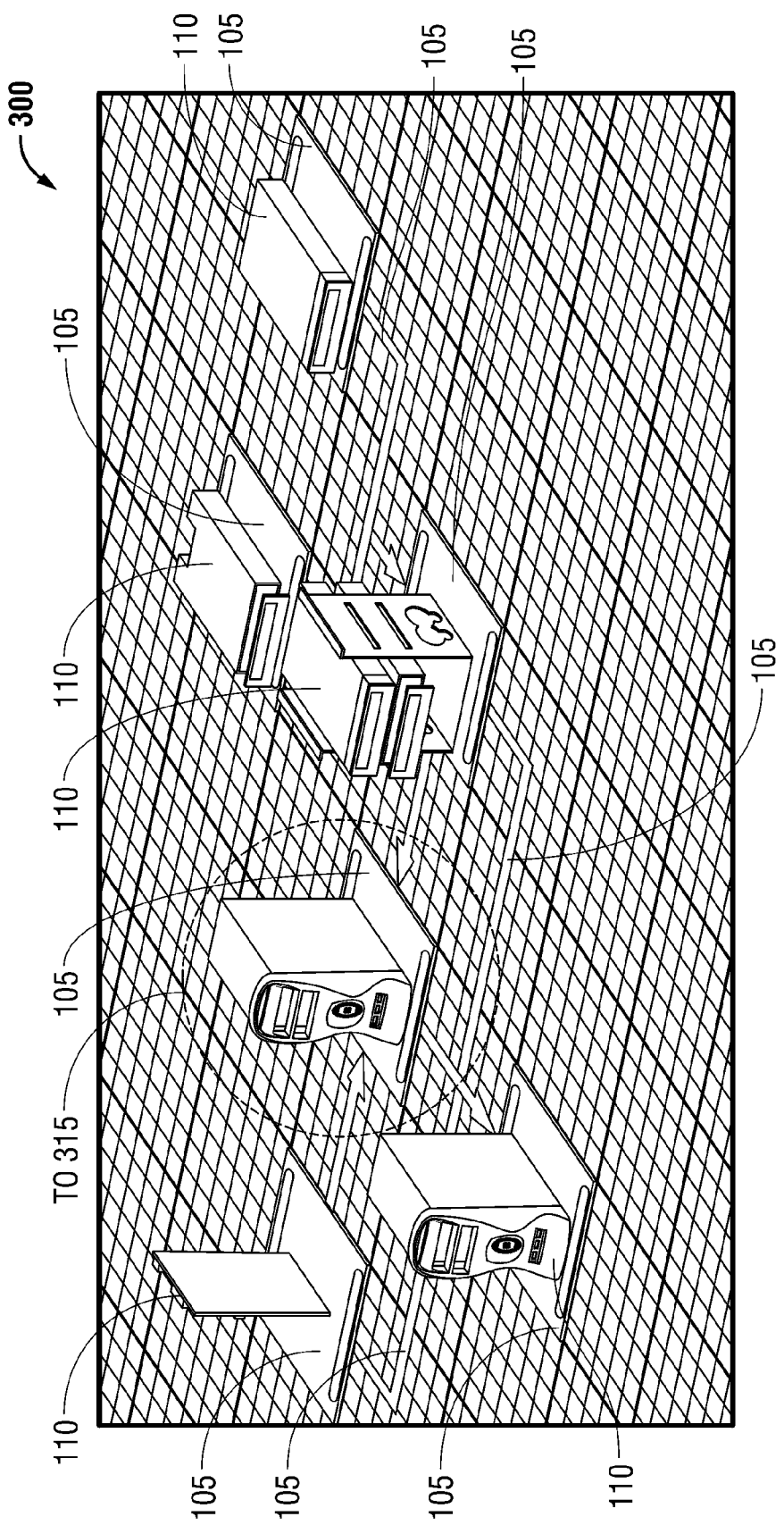
Figure 3B:
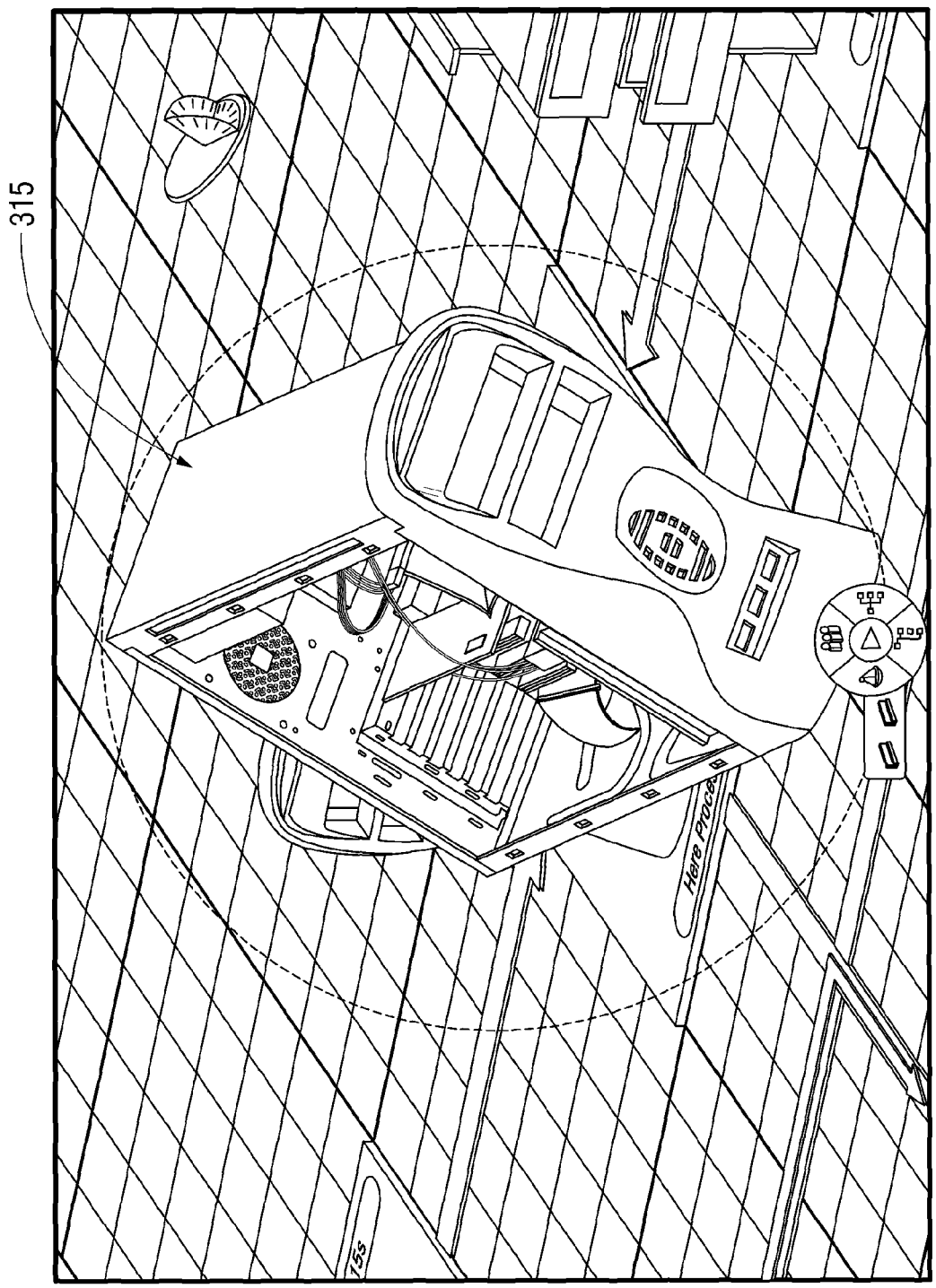

FIGS. 3A-3C illustrate an overall behavior of embodiments of the present invention and a user interacting with these embodiments to provide this behavior. Embodiments of the present invention capture or otherwise determine the user's navigational intent and in turn define a subject context (or navigation mode) from the user zooming in or otherwise focusing within the subject context. Conversely, embodiments of the present invention capture the user's intent not to navigate within the subject context from the user zooming out or otherwise focusing out from the subject context.

Based on the captured user's intention, embodiments of the present invention select the subject context within which to navigate. The subject context (or navigation mode) identifies a subject entity and provides an appropriate a navigation behavior for navigating the subject entity. In addition, an other context (or navigation mode) identifies an other entity and provides an other navigation behavior for navigating the other entity. In some instances, it may be convenient to refer to the other context as a current context to denote a context in which a user is currently navigating. In other instances, it may be convenient to refer to the other context as a previous context to denote a context in which a user previously navigated.

A user may zoom in and zoom out (focus in and focus out) of the screen view/display using any number of well-known techniques. As such, embodiments of present invention capture a user's intention to navigate within a subject context from any of the techniques that are known in the art.

FIG. 3A illustrates a user currently navigating an other context 300 (current context) illustrated as a planned process (e.g., the planned process 100 of FIG. 1) having process entities (e.g., the process entities 105 of FIG. 1) and product entities (e.g., the product entities 110 of FIG. 1). The user intends to navigate within a subject context 315 (FIG. 3B), illustrated in FIG. 3A as one of the product entities, and focuses in on that product entity.

FIG. 3B continuing from FIG. 3A illustrates, the user navigating within the subject context 315 (product entity). An embodiment identifies to the user the subject context 315 (product entity) separate and distinct from the other context 300 (planned process). A convenient embodiment displays in a manner that contrasts the subject context 315 from the other context 300 (planned process). In the example illustrated in FIG. 3B, the other context 300 (planned process) is effectively faded into the background or otherwise projected into the background and darkened. The subject context 315 (product entity), in contrast, is effectively displayed or otherwise presented to the foreground. Alternatively, other display attributes may be applied to the other context 300 (planned process), or the other context 300 may be hidden from view from the user.

In either case, the user navigates the subject context 315 (product entity) without navigating or otherwise affecting the other context 300 (planned process). For example, rotating the product entity of the subject context 315 does not rotate the process entities 110 of the other context 300. By capturing the user's intent to navigate a subject context from the user zooming in on the subject context, embodiments of the present invention apply a navigation behavior (e.g., rotating) to the subject context without applying such behavior to an other (e.g. previous) context. Moreover, described later in great detail, the navigation behavior is applied selectively. The applied navigation behavior, while suitable for navigating the subject context, may not necessarily be suitable for navigating the other context.

FIG. 3C continuing from FIG. 3B illustrates, that the user intends to no longer navigate the subject context 315 (product entity) and instead now intends to navigate the other context 300 (planned process). The user focuses out from the product entity of subject context 315. In response, embodiments of the present invention display the planned process context 300 of FIG. 3C.

A convenient embodiment switches to the navigation mode by changing from a previously navigated entity to the subject entity; and changing from a previous navigation behavior to the navigation behavior for navigating the subject entity. This may be referred to as a "behavior switch" or a "context switch."

As described earlier, selecting or switching to a subject context to navigate within is a function of or otherwise based on determining or capturing a user's intention to navigate within the subject context. Embodiments of the present invention determine or capture this intention to navigate a subject entity of the subject context based on a percentage of a screen view occupied by the subject entity.

Figure 4A:
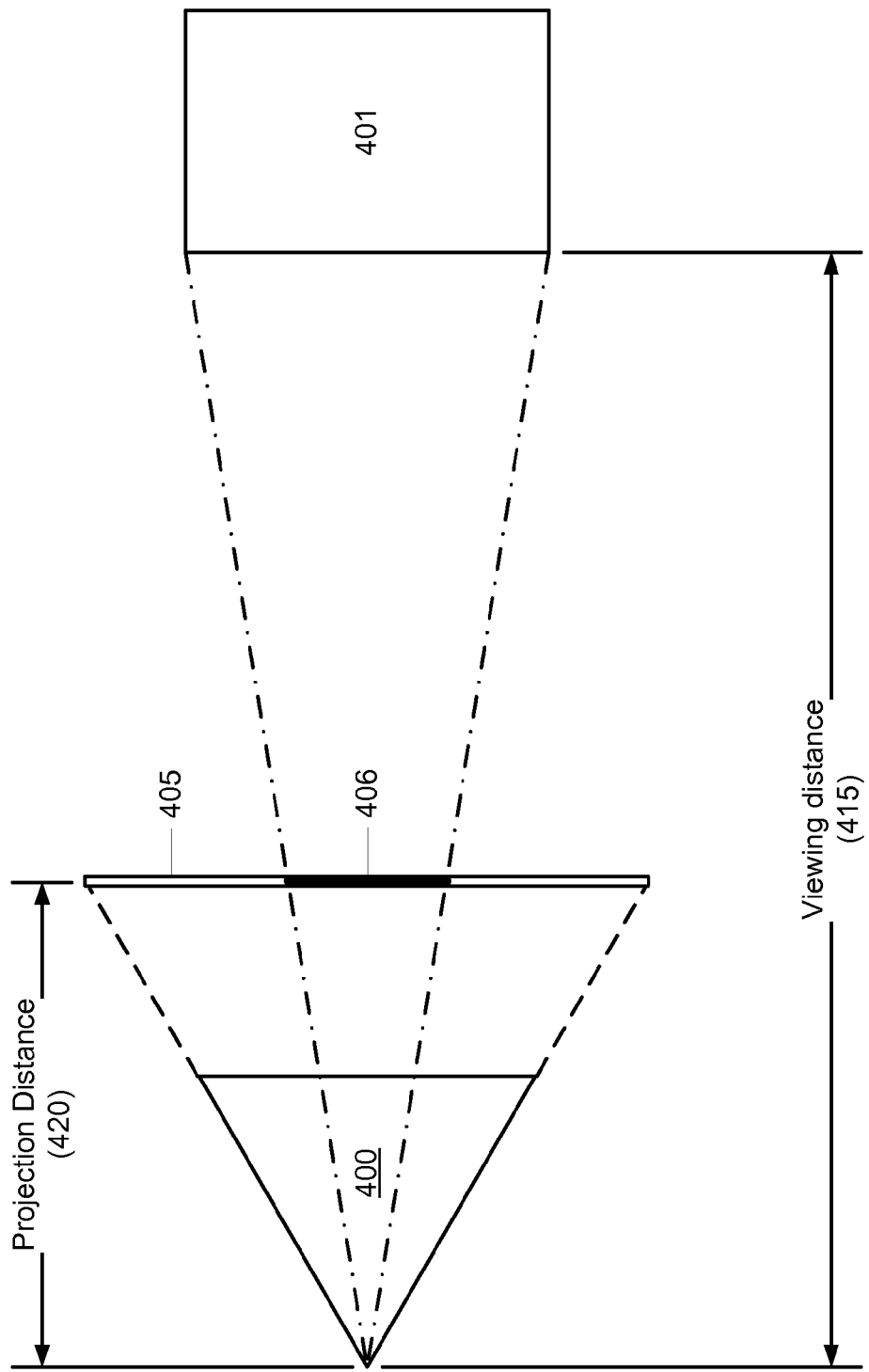
FIGS. 4A-C are block diagrams of a traditional camera.
Figure 4B:
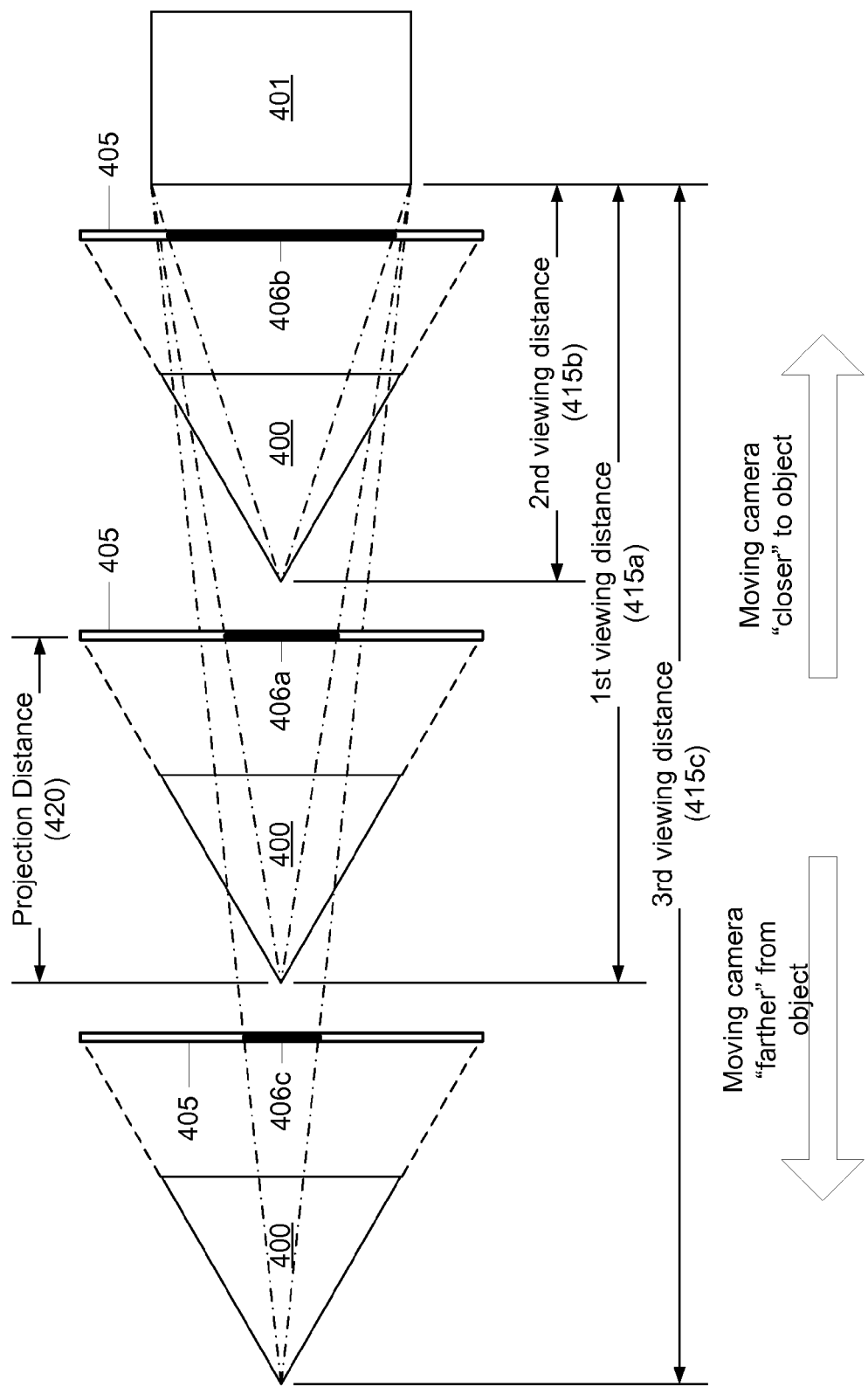
Figure 4C:
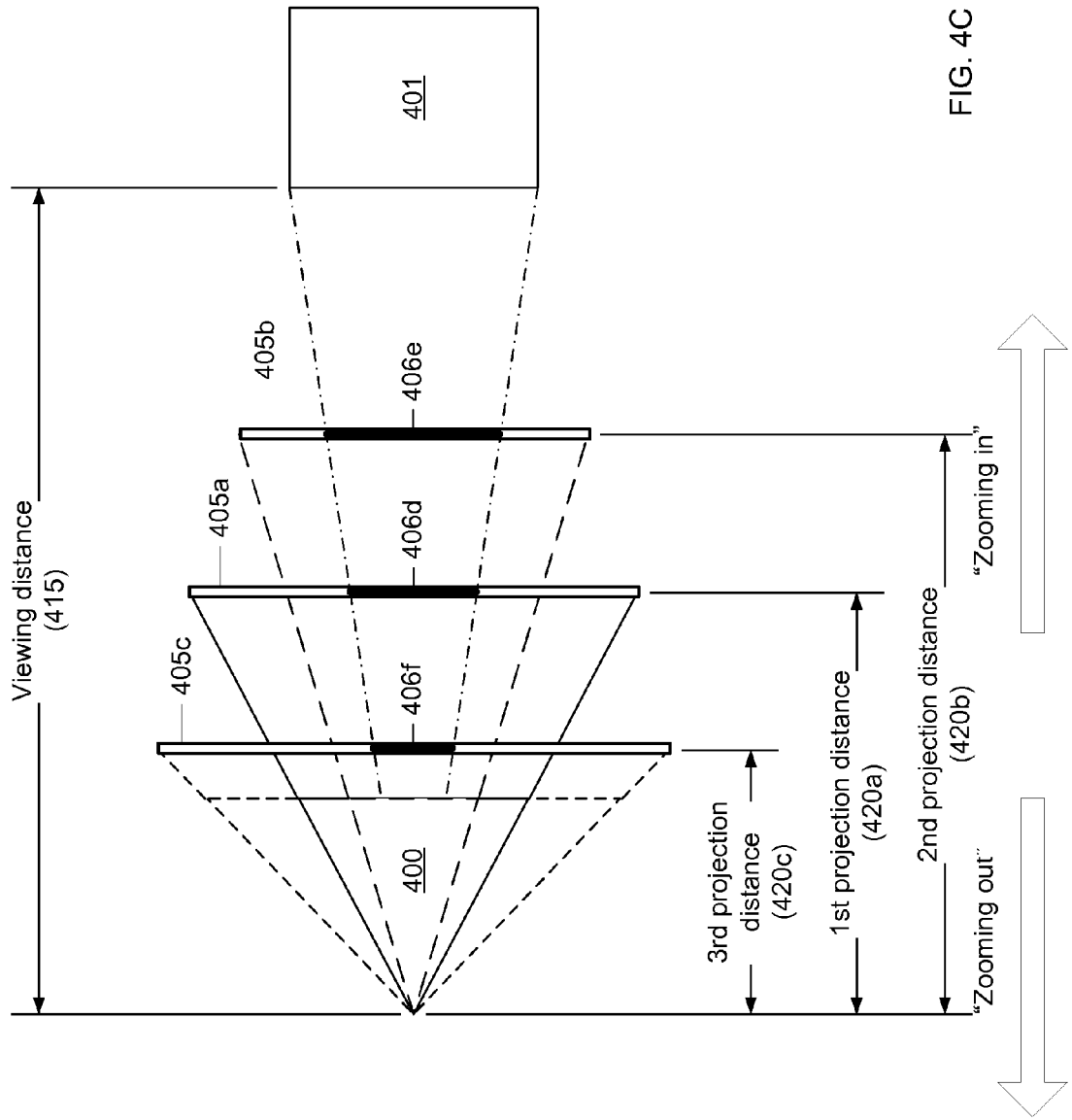

FIGS. 4A-C illustrate aspects of a traditional camera 400. Referring to FIG. 4A, the camera 400 projects a "real" object 401 onto a projection plane 405 as an image 406. A distance between the camera 400 and the real object 401 is a viewing distance 415. A distance between the camera 400 and the projection plane 405 is a projection distance 420. Changing, for example, either the viewing distance 415 or the projection distance 420 affects a percentage of the projection plane 405 occupied by the image 406.

FIG. 4B illustrates a viewing distance between the camera 400 and the real object 401 determining a percentage of the projection plane 405 occupied by an image. Moving the camera 400 "closer" to the real object 401 from a first viewing distance 415a to a second viewing distance 415b, decreases (or shortens) the viewing distance. Moving the camera 400 does not change the projection plane 405 because the move does not affect the projection distance 420.

However, while the projection plane 405 remains the same at either viewing distances, an image 406b that results from the camera 400 being at the second viewing distance 415b is "larger" than an image 406a that results from the camera 400 being at the first viewing distance 415a. As such, the image 406b occupies a greater percentage of the projection plane 405 than the image 406a.

Moving the camera 400 "farther" from the real object 401 from the first viewing distance 415a to a third viewing distance 415c, increases (or lengthens) the viewing distance. An image 406c that results from the camera 400 being at the third viewing distance 415c is "smaller" than the image 406a that results from the camera 400 being at the first viewing distance 415a. As such, the image 406c occupies a smaller percentage of the projection plane 405 than the image 406a.

Accordingly, there is a direct relationship between a viewing distance and the percentage of a projection plane occupied by an image. Increasing or lengthening a viewing distance, e.g., by moving a camera "closer," the greater the percentage of a projection plane occupied by an image. Conversely, decreasing or shortening a viewing distance, e.g., by moving a camera "farther," the lesser the percentage of a projection plane occupied by an image. Increasing and decreasing a viewing distance or otherwise moving a camera may be referred to as "camera motion."

FIG. 4C illustrates a projection distance between the camera 400 and a projection plane determining a percentage of the projection plane occupied by an image. Lengthening a projection distance from a first projection distance 420a to a second projection distance 420b (e.g., by increasing the focal length of a lens of the camera 400), decreases the size of a projection plane (or field of view), while increasing the size of an image. Lengthening a projection distance may be referred to as "zooming in" or "zoom in."

A projection plane 405b at the second projection distance 420b is smaller than a projection plane 405a at the first projection distance 420a, while an image 406e at the second projection distance 420b is larger than an image 406d at the first projection distance 420a. As such, the image 406e occupies a greater percentage of a projection plane than the image 406d.

Shortening a projection distance from the first projection distance 420a to a third projection distance 420c (e.g., by shortening the focal length of a lens of the camera 400), increases the size of a projection plane, while decreases the size of an image. Shortening a projection distance may be referred to as "zooming out" or "zoom out"

A projection plane 405c at the third projection distance 420c is larger than a projection plane 405a at the first projection distance 420a, while an image 406f at the third projection distance 420c is smaller than the image 406d at the first projection distance 420a. As such, the image 406f occupies a lesser percentage of a projection plane than the image 406d.

Accordingly, there is a direct relationship between a projection distance and the percentage of a projection plane occupied by an image. Increasing or lengthening a projection distance, e.g., by increasing the focal length of a lens of a camera, the greater the percentage of a projection plane occupied by an image. Conversely, decreasing or shortening a projection distance, e.g., by decreasing the focal length of a lens of a camera, the lesser the percentage of a projection plane occupied by an image.

The foregoing aspects of the traditional camera 400 may be modeled or otherwise simulated by a computer. Embodiments of the present invention will be described in reference to a computer model of a camera (or "modeled camera"). In the modeled camera, the projection plane 405 is referred to as a screen view and the image 406 is referred to as a subject entity. Analogous to an image projected onto a projection plane occupies a percentage of the projection plane, in the modeled camera, a subject entity in a screen view also occupies a percentage of the screen view.

In the modeled camera, a modeled viewing distance simulates a viewing distance of a traditional camera (e.g., the viewing distance 415 between the camera 400 and the real object 401 of FIG. 4A). In some embodiments, the modeled viewing distance may be a distance to a subject entity in a screen view or a derivative thereof. In the modeled camera, a modeled projection distance simulates a projection distance of a traditional camera (e.g., the projection distance 420 between the camera 400 and the projection plane 405 of FIG. 4A).

A focus of the modeled camera is determined, for example, with a camera target. The camera target may be an actual point or graphic. Alternatively, the camera target may be a virtual point, for example, the middle of a computer monitor being viewed by a user using embodiments of the present invention. The focus of the modeled camera changes as the camera target changes from targeting a first entity (e.g., the subject entity) to targeting a second entity (e.g., other entity).

Figure 5:
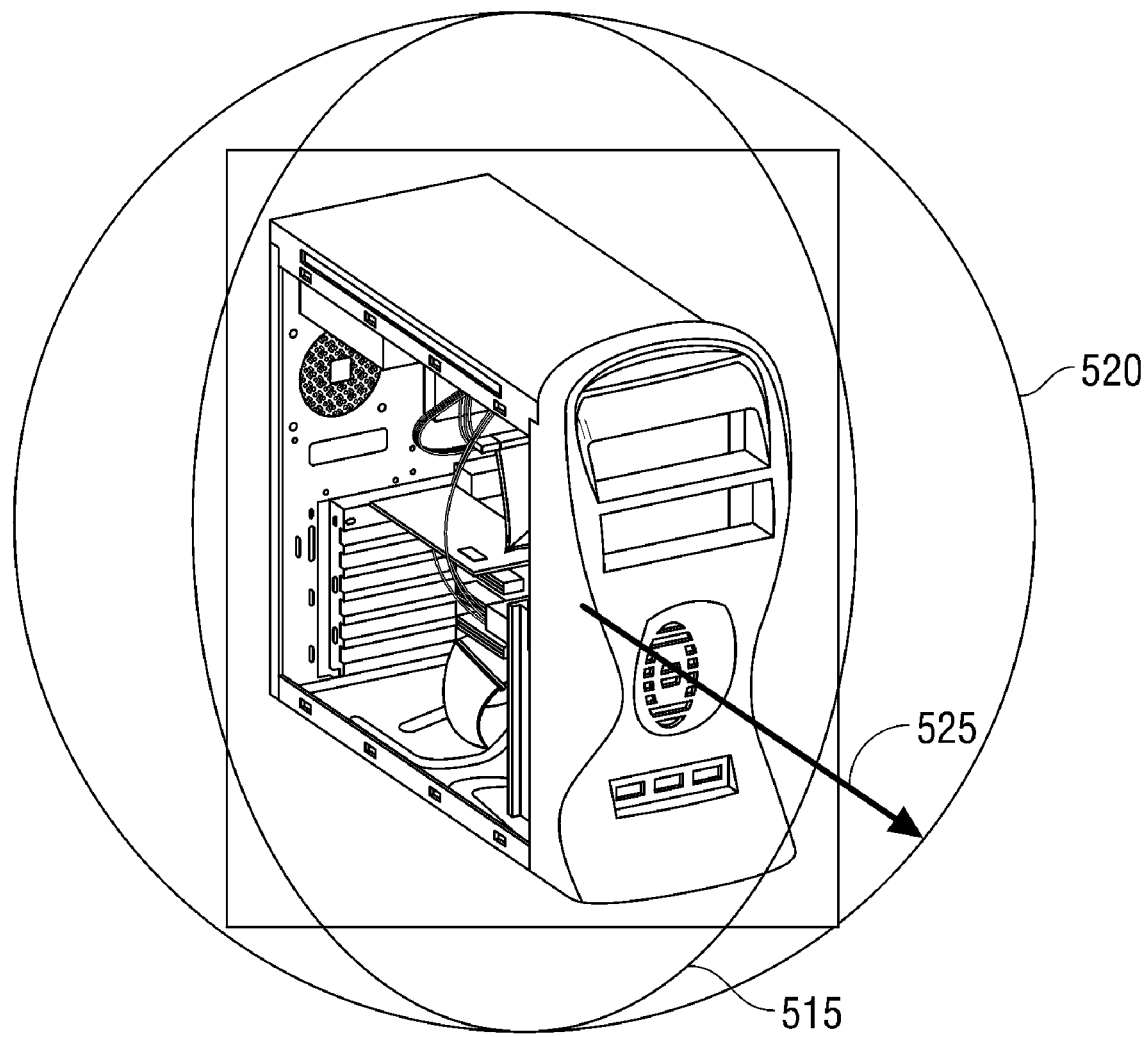
FIG. 5 is a diagram of a bounding sphere circumscribing a subject entity, in accordance with an embodiment of the present invention.

Turning to FIG. 5, in determining a user's intention to navigate a subject entity 515, it may be convenient to circumscribe or otherwise contain the subject entity 515 with a sphere 520, hereinafter, referred to as a "bounding sphere." As illustrated, the bounding sphere 520 surrounds or otherwise bounds the subject entity 515. In some embodiments, the bounding sphere 520 touches as many points of the subject entity 515 as possible. The bounding sphere 520 is but one example of a shape circumscribing or otherwise containing the subject entity 515. It should be readily apparent that embodiments of the present invention also contemplate other shapes, such as a circle, polygon, sphere, parallelepiped, or other regular geometry. As such, a percentage of a screen view occupied by the subject entity 515 may be a ratio between the space taken up by a shape that contains the subject entity 515 and the space of the screen view. The ratio may be an integer or a positive real number.

A convenient embodiment calculates or otherwise determines a percentage of a screen view occupied by a subject entity using two factors: (i) modeled viewing distance that simulates a viewing distance of a traditional camera (e.g., the viewing distance 415 between the camera 400 and the real object 401 of FIG. 4A); and (ii) a dimension of a shape circumscribing the subject entity. In the case of the bounding sphere 520 of FIG. 5, the dimension is a radius 525. For other shapes, such as a circle, polygon, sphere, parallelepiped, or regular geometry, the dimension may be an element that, at least in part, defines the shape mathematically. For example, in the case of a polygon, the dimension is a side of the polygon. Continuing with the bounding sphere 520 of FIG. 5, an example embodiment calculates the screen view percentage that is determinative of an intention to navigate the subject entity as follows. When the modeled viewing distance (D) is less than a multiple of the radius (R) 525 of the bounding sphere 520 circumscribing the subject entity 515 (i.e., D<nR, n being a positive integer or real number), the invention system determines that the user intends to navigate the subject entity 515.

Figure 6:
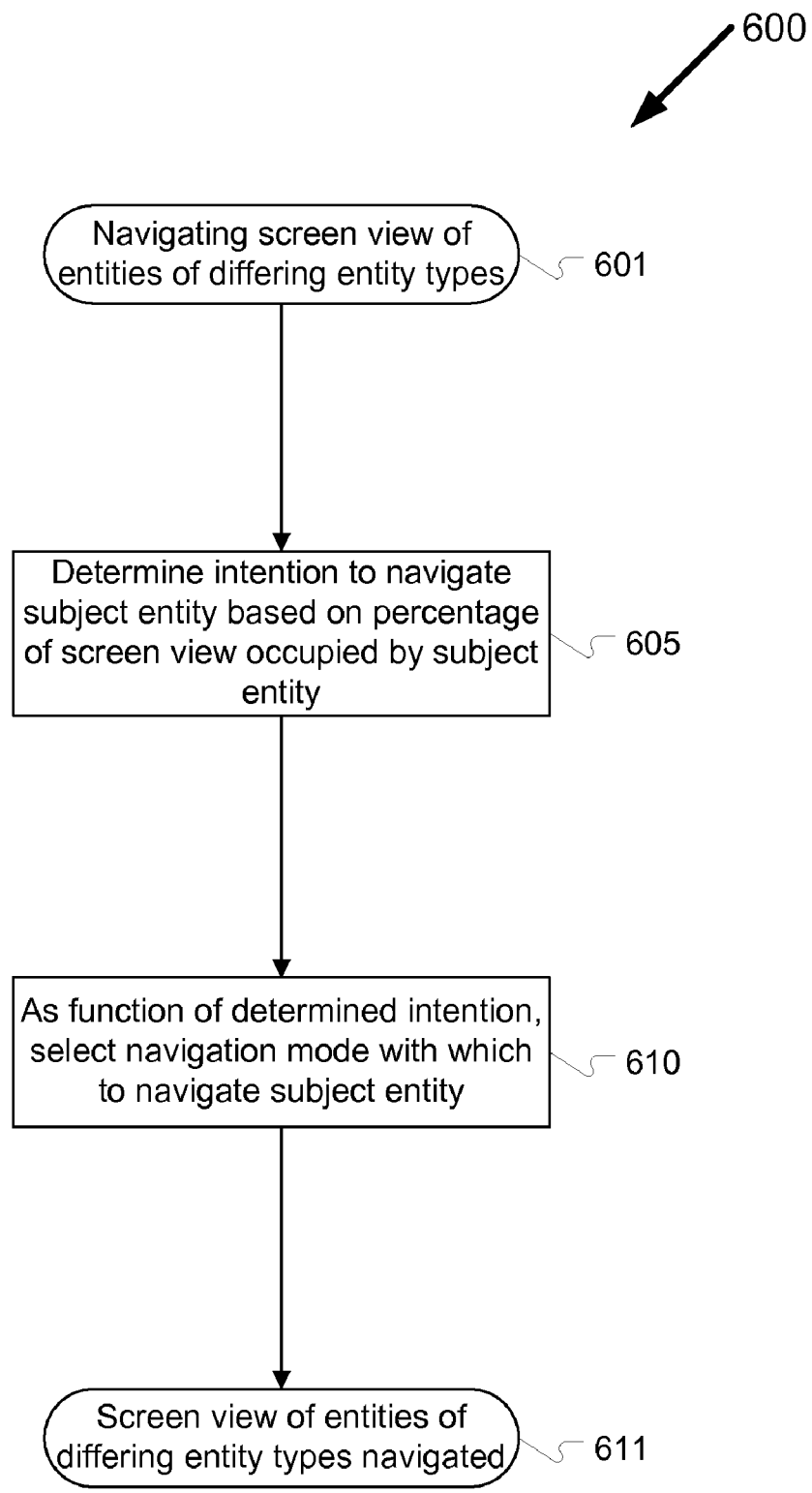
FIG. 6 is a flow chart of an example process computer routine for navigating a screen view of entities of differing entity types, in accordance with an embodiment of the present invention.

FIG. 6 illustrates an example computer process 600 of the present invention for navigating a screen view of entities of differing entity types. The process 600 starts (601). The process 600 determines 605 an intention to navigate a subject entity based on a percentage of the screen view occupied by the subject entity. The process 600, as a function of the determined intention, then selects (610) a navigation mode with which to navigate the subject entity. The selected navigation mode identifies the subject entity and provides a navigation behavior for navigating the subject entity. The process 600 ends (611) with the screen view of entities of differing entity types navigated using respective navigation modes as determined and selected in steps 605 and 610.

Figure 7:
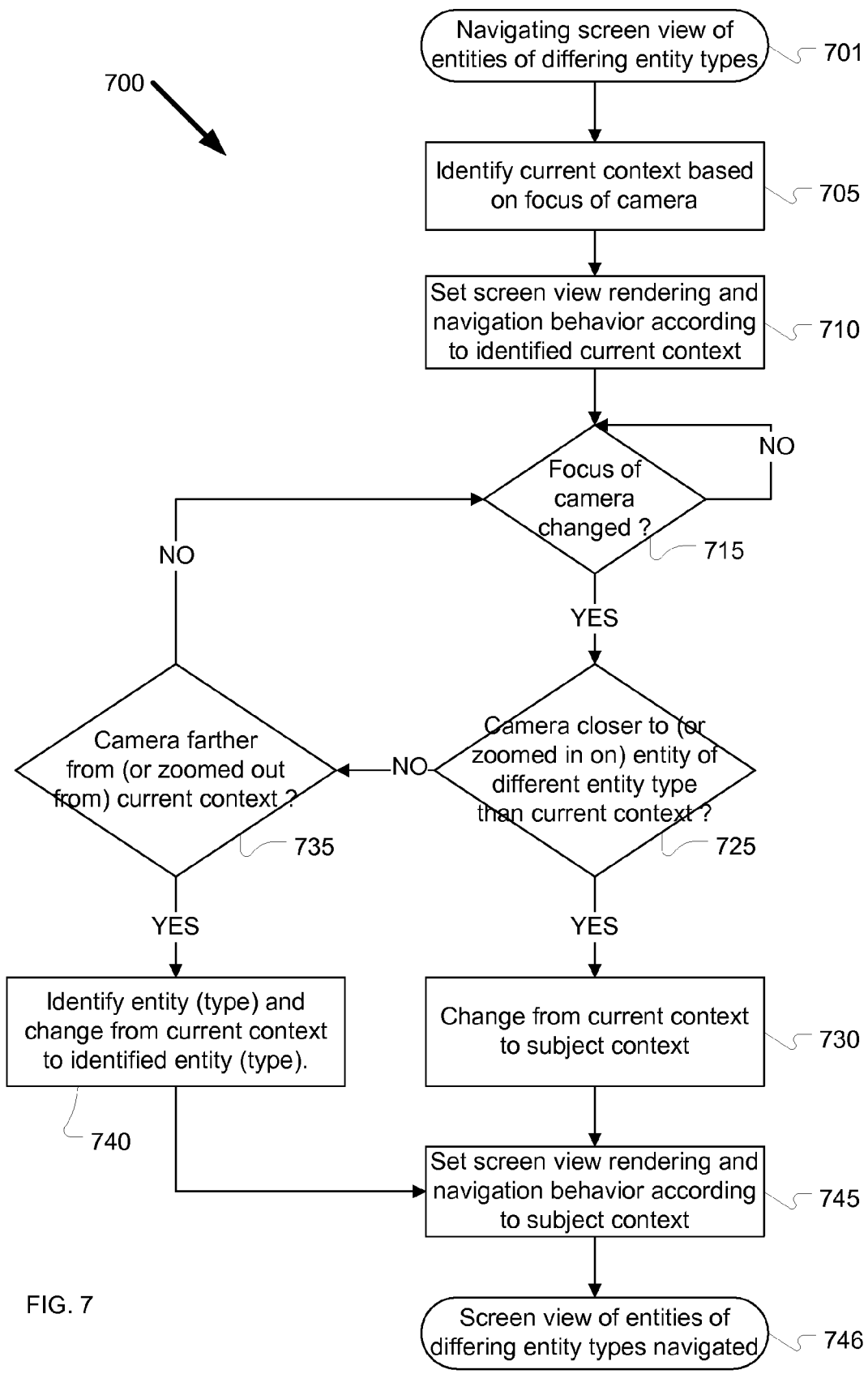
FIG. 7 is a flow chart of an example process computer routine for navigating a screen view of entities of differing entity types, in accordance with an embodiment of the present invention.

FIG. 7 illustrates another example computer process 700 for navigating a screen view of entities of differing entity types. The process 700 starts (701) given a screen view of entities of differing entity types. Optionally, the process 700 retrieves or otherwise obtains (not shown) the entities into the screen view.

The process 700 identifies (705) a current context and entity of the current context based on the focus of a camera (e.g., the camera 400 of FIG. 4A). To further illustrate the process 700 refer to FIG. 3A in which a user currently navigates an other context 300 (current context), illustrated in FIG. 3A as a planned process (entity of current context). Returning to FIG. 7, the process 700 sets (710) screen view rendering and a navigation behavior (e.g., rotate) according to the identified current context.

Using FIG. 3A as an example, the process 700 sets (710) the screen view rendering and the navigation behavior according to the identified planned process 300 (entity of current context) having the process entities 105 and the product entities 110. As such, in this example, navigating the identified planned process 300 (entity of current context) by rotating the planned process 300 also rotates the process entities 105 and the product entities 110 of the planned process 300. The user's intent to navigate the subject context 315 may be detected or otherwise captured by an embodiment on the present invention as follows.

The process 700 determines (715) whether the focus of the modeled camera changed under user interaction. If the process 700 determines (715) that the focus of the modeled camera changed, the process 700 then determines (725) whether the camera is closer to (or zoomed in on) an other entity of a different entity type than the entity of the current context; else the process 700 continues to determine (715) whether the focus of the camera changed.

Using FIG. 3A as an example, the process 700 determines (725) whether the camera is closer to (or zoomed in on) the product entity 315 (entity of subject context) than the planned process 300 (entity of current context). Assume for purpose of illustration the user intends to navigate the subject context 315. The focus of the modeled camera changed from the planned process 300 to the product entity 315 and the modeled camera is closer to (or zoomed in on) the product entity 315 than the planned process 300.

If the process 700 determines (725) that the camera is closer to (or zoomed in on) the other entity of a different entity type than the entity of the current context, the process 700 changes (730) from the current context to a subject context and a subject entity of the subject context; else the process 700 determines (735) whether the modeled camera is farther from (or zoomed out from) the entity of the current context.

Using FIG. 3B as an example, the camera is closer to (or zoomed in on) the product entity 315 than the planned process 300 and the process 700 changes (730) or otherwise switches from the planned process 300 (current context) to the product entity 315 (subject context).

The process 700 sets (745) the screen view rendering and navigation behavior according to the subject context. The process 700 ends (746) with the screen view of entities of differing entity types navigated.

Using FIG. 3B as an example, the process 700 sets (745) the screen view rendering and the navigation behavior according to the identified product entity 315 (entity of subject context). As such, in this example, navigating the identified product entity 315 (entity of subject context) by rotating the product entity 315 does not rotate the planned process 300 (previous context) or the other entities of the planned process 300.

Returning to FIG. 7, if the process 700 determines (725) that the camera is not closer to (or not zoomed in on) the other entity of a different entity type than the entity of the current context, the process 700 then determines (735) whether the camera is farther from (or zoomed out from) the entity of the current context and other entities in the screen view; else the process 700 returns to determine (715) whether the focus of the modeled camera changed under user interaction.

If the process 700 determines (735) that the camera is farther from (or zoomed out from) the entity of the current context and other entities in the screen view, the process 700 then identifies (740) both the entity of the current context and the other entities in the screen view and changes from the current context to an other context with the entities identified.

Using FIG. 3B as an example, assume for purpose of illustration the user is currently navigating the product entity 315 (current context). Assume for purpose of illustration the user intends to no longer navigate the subject context 315. The focus of the modeled camera changed and the modeled camera is farther from (or zoomed out from) the product entity 315.

Continuing the example with FIG. 3C, the process 700 then identifies (740) both the product entity 315 (entity of the current context) and the other entities of the screen view and changes from the product entity 315 (current context) to the planned process 300 (other context with entities identified).

The process 700 sets (745) the screen view rendering and navigation behavior to the other context. As such, in the example of FIG. 3C, navigating the identified planned process 300 (entity of current other/subject context) by rotating the planned process 300 also rotates the process entities and the product entities of the planned process 300.

The process 700 ends (746) with the screen view of entities of differing entity types navigated.

Figure 8A:
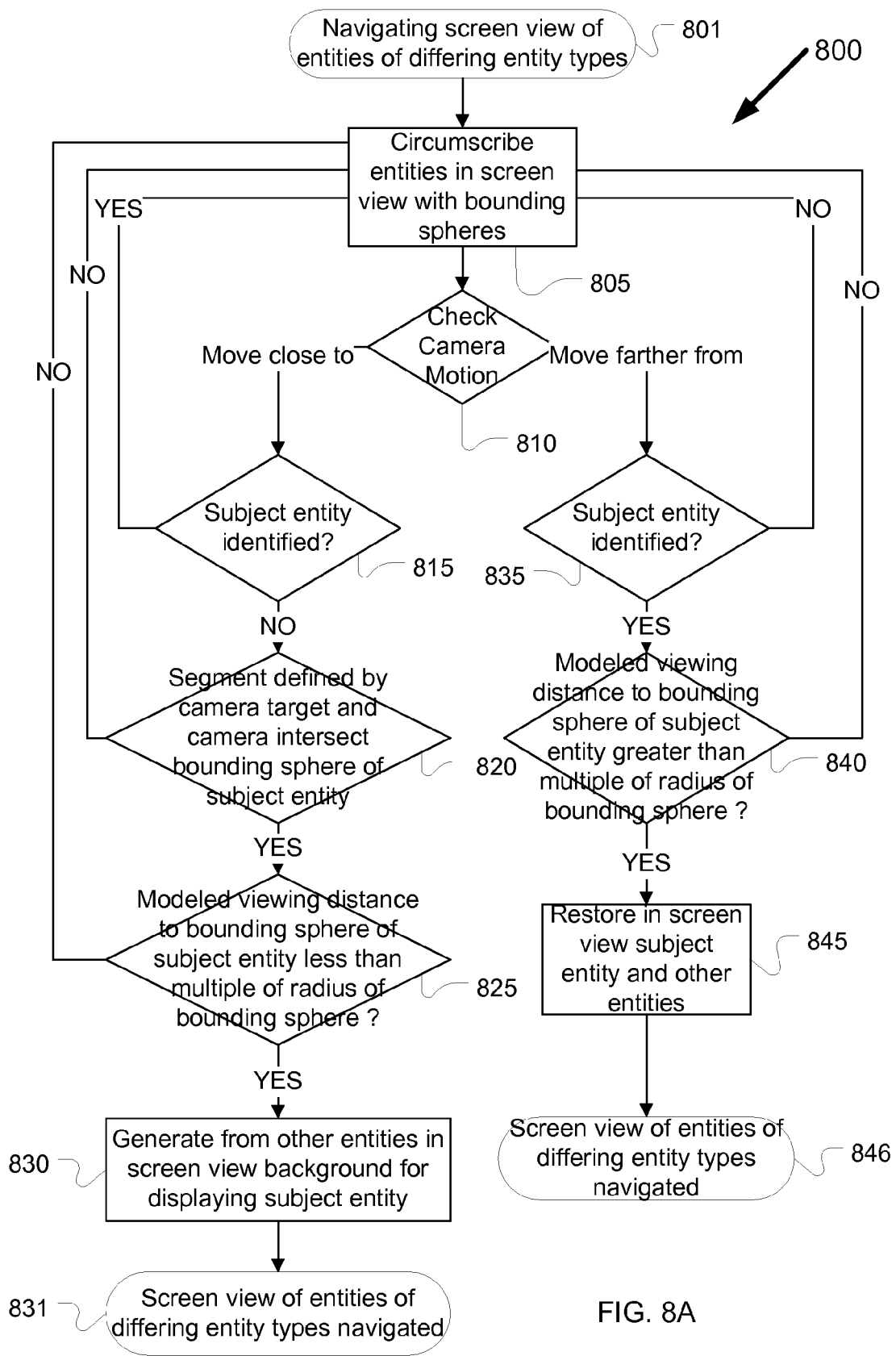
FIGS. 8A-B are flow charts of example processes computer routine for navigating a screen view of entities of differing entity types, in accordance with embodiments of the present invention.

FIG. 8A illustrates an example computer process 800 for navigating a screen view of entities of differing entity types. The process 800 starts (801). The process 800 circumscribes (805) the entities in the screen view with bounding spheres (e.g., the bounding sphere 520 with the radius 525 of FIG. 5). Alternatively, the process 800 is given or otherwise provided with the screen view of entities, each circumscribed with a bounding sphere.

The process 800 determines (810) whether a modeled viewing distance of a modeled camera (or user view point) is increasing or decreasing (i.e., check camera motion). If the process 800 determines (810) that the modeled viewing distance is decreasing (i.e., move close), the process 800 then determines (815) whether a subject entity is identified from other entities in the screen view.

If the process 800 determines (815) that the subject entity is not identified from other entities, the process 800 then determines (820) whether a segment defined by a camera target (described above) and the modeled camera intersects a bounding sphere circumscribing the subject entity; else the process 800 returns to determine (810) whether the modeled viewing distance is increasing or decreasing.

Decreasing a modeled viewing distance causes both a subject entity and a bounding sphere circumscribing the subject entity to increase in size, and occupy a greater percentage of a screen view. Given the relationship between the size of the bounding sphere (as measured by the radius of the bounding sphere) and the modeled viewing distance, a percentage determinative of an intention to navigate the subject entity may be represented by the following example inequality: modeled viewing distance less than a multiple of a radius of a bounding sphere. In this example, changing the multiple of the radius of the bounding sphere changes the percentage determinative of an intention to navigate the subject entity. In this way, how sensitive embodiments of the present invention are to a user's intent to navigate a subject entity may be adjusted or otherwise configured.

Continuing with FIG. 8A, if the process 800 determines (820) that the segment defined by the camera target and the modeled camera intersects the bounding sphere circumscribing the subject entity (and thus identifies the subject entity), the process 800 determines (825) whether the modeled viewing distance is less than a multiple of the radius of the bounding sphere; else the process 800 returns to determine (810) whether the modeled viewing distance is increasing or decreasing. Recall, the modeled viewing distance simulates a viewing distance of a traditional camera (e.g., the viewing distance 415 between the camera 400 and the real object 401 of FIG. 4A). In one convenient embodiment, the modeled viewing distance is a distance along the segment to the bounding sphere of the subject entity.

If the process determines (825) that the modeled viewing distance is less than the multiple of the radius of the bounding sphere, the process 800 then generates (830) from other entities in the screen view, a background for displaying the subject entity; else the process 800 returns to determine (810) whether the modeled viewing distance is increasing or decreasing.

Alternatively, a convenient embodiment identifies to a user the subject entity separate and distinct from other entities of the screen view, for example, by displaying in a manner that contrasts the subject entity from the other entities in the screen view or by effectively removing or otherwise hiding the other entities from the screen view.

The process 800 ends (831) with the screen view of entities of differing entity types navigated.

Returning to the process 800 determining (810) whether the modeled viewing distance is increasing or decreasing, if the process 800 determines (810) that the modeled viewing distance is increasing (i.e., move farther), the process 800 then determines (835) whether a subject entity is identified from other entities in the screen view.

If the process 800 determines (835) that the subject entity is identified from the other entities in the screen view, the process 800 then determines (840) whether the modeled viewing distance is greater than a multiple of the radius of the bounding sphere; else the process 800 returns to determine (810) whether the modeled viewing distance is increasing or decreasing.

If the process 800 determines (840) that the modeled viewing distance is greater than a multiple of the radius of the bounding sphere, the process 800 then displays or otherwise restores (845) in the screen view, the subject entity and the other entities; else the process 800 returns to determine (810) whether the modeled viewing distance is increasing or decreasing.

The process 800 ends (846) with the screen view of entities of differing entity types navigated.

Figure 8B:
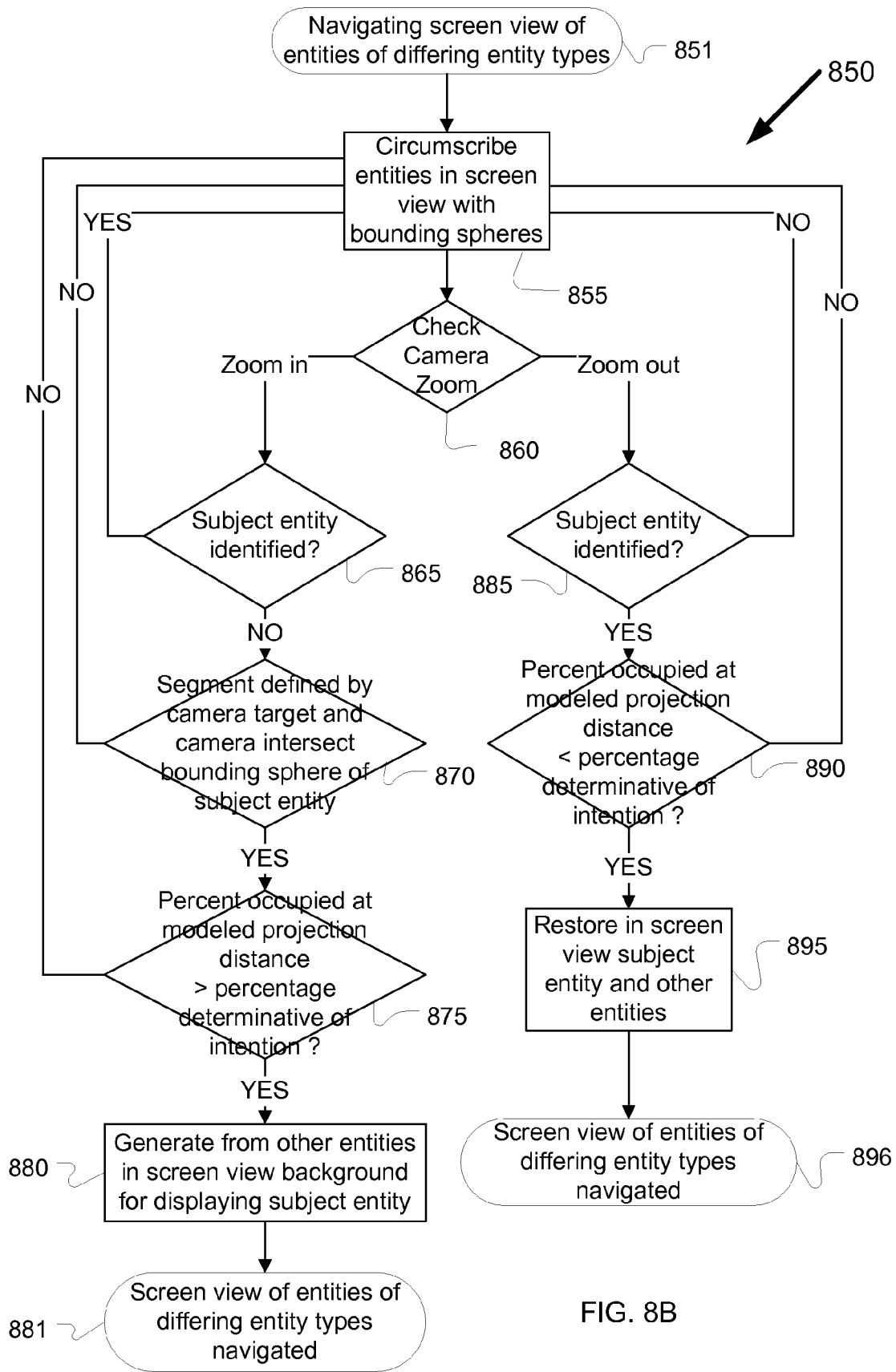

FIG. 8B illustrates another example computer process 850 for navigating a screen view of entities of differing entity types. The process 850 starts (851). The process 850 circumscribes (855) the entities in the screen view with bounding spheres (e.g., the bounding sphere 520 with the radius 525 of FIG. 5). Alternatively, the process 850 is given or otherwise provided with the screen view of entities, each circumscribed with a bounding sphere.

The process 850 determines (860) whether a modeled projection distance of a modeled camera (or user view point) is increasing or decreasing (i.e., check camera zoom). If the process 850 determines (860) that the modeled projection distance is decreasing (i.e., zoom in), the process 850 then determines (865) whether a subject entity is identified from other entities in the screen view.

If the process 850 determines (865) that the subject entity is not identified from other entities, the process 850 then determines (870) whether a segment defined by a camera target (described above) and the modeled camera intersects a bounding sphere circumscribing the subject entity; else the process 850 returns to determine (860) whether the modeled projection distance is lengthening or shortening.

Lengthening or increasing a modeled projection distance causes a subject entity and a bounding sphere circumscribing the subject entity to increase in size, while causing a screen view to decrease in size. Conversely, shortening or decreasing the modeled projection distance causes the subject entity and the bounding sphere circumscribing the subject entity to decrease in size, while causing the screen view to increase in size. As such, a percentage of a screen view occupied by a subject entity may be calculated from or otherwise based on a modeled projection distance that determines the size of the screen view and the size of the subject entity in the screen view. Further, this percentage may be compared against a percentage determinative of an intention to navigate the subject entity. An example comparison may be the following inequality: a percentage of a screen view occupied by a subject entity at a modeled projection distance is greater than (or equal to) a percentage determinative of an intention to navigate the subject entity. In this example, changing the percentage determinative of an intention to navigate the subject entity (e.g., by a multiplier or factor) sets how sensitive embodiments of the present invention are to a user's intent to navigate a subject entity.

Continuing with FIG. 8B, if the process 850 determines (870) that the segment defined by the camera target and the modeled camera intersects the bounding sphere circumscribing the subject entity (and thus identifies the subject entity), the process 850 determines (875) whether a percentage of the screen view occupied by the subject entity at the modeled projection distance is greater than a percentage determinative of an intention to navigate the subject entity; else the process 850 returns to determine (810) whether the modeled projection distance is increasing or decreasing.

If the process determines (875) that the percentage of the screen view occupied by the subject entity at the modeled projection distance is greater than the percentage determinative of an intention to navigate the subject entity, the process 850 then generates (880) from other entities in the screen view, a background for displaying the subject entity; else the process 850 returns to determine (860) whether the modeled projection distance is increasing or decreasing.

Alternatively, a convenient embodiment identifies to a user the subject entity separate and distinct from other entities of the screen view, for example, by displaying in a manner that contrasts the subject entity from the other entities in the screen view or by effectively removing or otherwise hiding the other entities from the screen view.

The process 850 ends (881) with the screen view of entities of differing entity types navigated.

Returning to the process 850 determining (860) whether the modeled projection distance is increasing or decreasing, if the process 850 determines (860) that the modeled projection distance is increasing (i.e., zoom out), the process 850 then determines (885) whether a subject entity is identified from other entities in the screen view.

If the process 850 determines (885) that the subject entity is identified from the other entities in the screen view, the process 850 then determines (890) whether a percentage of the screen view occupied by the subject entity at the modeled projection distance is less than a percentage determinative of an intention to navigate the subject entity; else the process 850 returns to determine (860) whether the modeled projection distance is increasing or decreasing.

If the process 850 determines (890) that the modeled projection distance is less than a percentage determinative of an intention to navigate the subject entity, the process 850 then displays or otherwise restores (894) in the screen view, the subject entity and the other entities; else the process 850 returns to determine (860) whether the modeled projection distance is increasing or decreasing.

The process 850 ends (896) with the screen view of entities of differing entity types navigated.

Figure 9:
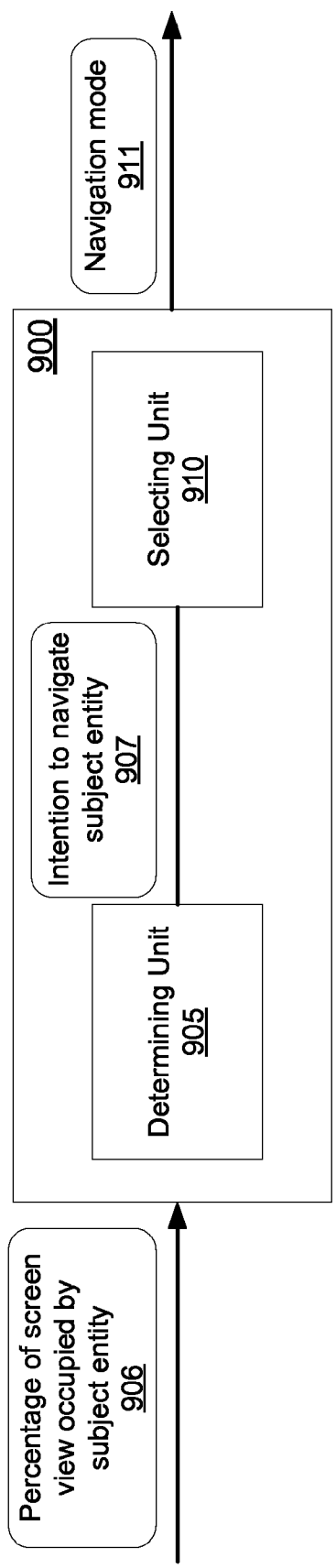
FIG. 9 is a block diagram of an example apparatus to navigate a screen view of entities of differing entity types, in accordance with an embodiment of the present invention.

FIG. 9 illustrates an example apparatus 900 to navigate a screen view of entities of differing entity types according to the present invention. The apparatus 900 includes a determining unit 905 communicatively coupled to a selecting unit 910. The determining unit 905, based on a percentage of the screen view occupied by a subject entity 906, determines an intention 907 to navigate a subject entity. From the determined intention 907, the selecting unit 910 selects a navigation mode 911. The navigation mode 911 identifies the subject entity and provides a navigation behavior for navigating the subject entity In a convenient embodiment, the determining unit 905 includes a calculating unit (not shown) to calculate the percentage of the screen view occupied by the subject entity from a modeled viewing distance and a dimension of a shape circumscribing the subject entity.

In another convenient embodiment, the determining unit 905 includes a calculating unit (not shown) to calculate the percentage of the screen view occupied by the subject entity from a modeled projection distance that determines the size of the screen view and the size of the subject entity in the screen view.

In yet another convenient embodiment, the selecting unit 910 includes an identifying unit (not shown) to identity to a user the subject entity separate and distinct from other entities of the screen view.

While described in reference to a screen view of a planned process having process entities and product entities, those skilled in the art will readily recognize that the foregoing embodiments of the present invention apply to any heterogeneous environment having entities of differing entity types. For example, embodiments of the present invention may be used for navigating a screen view of a mapped city having a city entity and at least one building entity. In such an example, a convenient embodiment determines a user's intention to navigate a building entity based on a percentage of the screen view occupied by the building entity, and selects a navigation mode. The selected navigation mode identifies to the user the building entity separate and distinct from the city entity and other building entities of the screen view of the mapped city, and provides to the user a navigation behavior for navigating the building entity while the city entity and the other building entities of the screen view of the mapped city are unaffected by the provided navigation behavior.

Another convenient embodiment, in selecting a navigation mode, provides to a user a navigation behavior for navigating a city entity at a bird's eye view in an event the user's intention, as determined, is to navigate the city entity. Or the invention system provides to the user a navigation behavior for navigating a building entity at a street-level view in an event the user's intention, as determined, is to navigate the building entity.

While described in reference to a three dimensional screen view of a planned process, those skilled in the art will readily recognize that the foregoing embodiments of the present invention apply to a two dimensional screen view or a mix of two dimensional and three dimensional screen views. For example, a convenient embodiment provides to a user a navigation behavior for navigating a process entity on a plane (two dimensional screen view) in an event the user's intention, as determined, is to navigate the process entity. Or the example embodiment provides to the user a navigation behavior for navigating a product entity in a space (three dimensional screen view) in an event the user's intention, as determined, is to navigate the product entity. Thus accommodating instances in which a navigation behavior for rotating an entity and allowing the underside of the entity to be seen, while applicable or otherwise suited for navigating, for example, a product entity, is not suited for navigating a process entity.

Figure 10A:
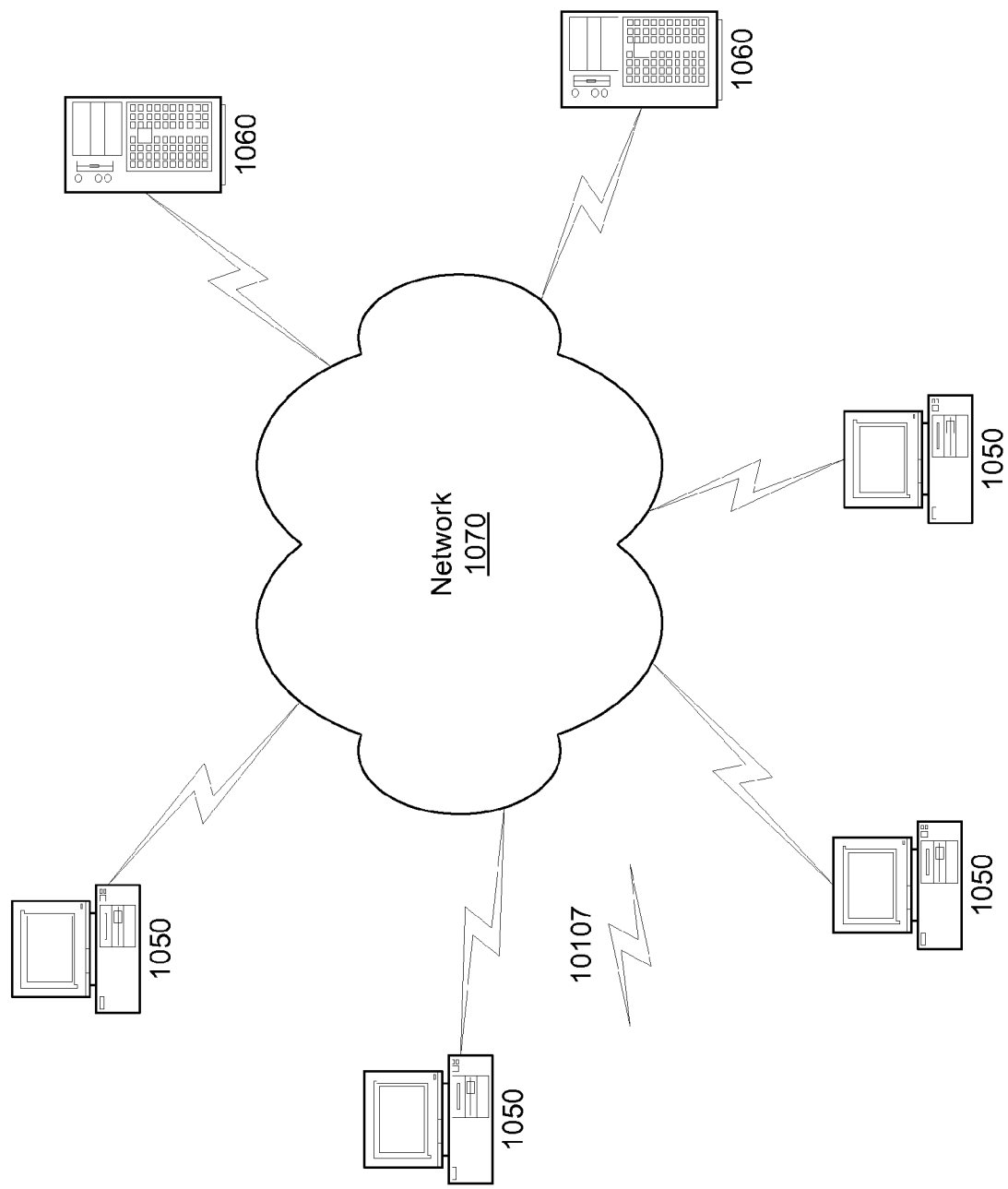
FIG. 10A is an example computer network deploying example embodiments of the present invention.

FIG. 10A illustrates a computer network or similar digital processing environment in which embodiments of the present invention may be deployed. Client computer(s)/devices 1050 and server computer(s) 1060 provide processing, storage, and input/output devices executing application programs and the like. Client computer(s)/devices 1050 can also be linked through communications network 1070 to other computing devices, including other client devices/processes 1050 and server computer(s) 1060. Communications network 1070 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 10B is a block diagram of the internal structure of a computer (e.g., client processor/device 1050 or server computers 1060 of FIG. 10A) in which various embodiments of the present invention may be implemented. Each computer 1050, 1060 contains system bus 1079, where a bus is a set of hardware lines used for data transfer among the components of a computer or processing system. Bus 1079 is essentially a shared conduit that connects different elements of a computer system (e.g., processor, disk storage, memory, input/output ports, network ports, etc.) that enables the transfer of information between the elements. Attached to system bus 1079 is I/O device interface 1082 for connecting various input and output devices (e.g., keyboard, mouse, displays, printers, speakers, etc.) to the computer 1050, 1060. Network interface 1086 allows the computer to connect to various other devices attached to a network (e.g., network 1070 of FIG. 10A). Memory 1090 provides volatile storage for computer software instructions 1092 and data 1094 (e.g. described above with reference to FIGS. 6-9) used to implement an embodiment of the present invention. Disk storage 1095 provides non-volatile storage for computer software instructions 1092 and data 1094 used to implement an embodiment of the present invention. Central processor unit 1084 is also attached to system bus 1079 and provides for the execution of computer instructions.

In one embodiment, the processor routines 1092 and data 1094 are a computer program product (generally referenced 1092), including a computer readable medium (e.g., a removable storage medium such as one or more DVD-ROM's, CD-ROM's, diskettes, tapes, etc.) that provides at least a portion of the software instructions for the invention system. Computer program product 1092 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 10107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 1092.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 1092 is a propagation medium that the computer system 1050 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented in a variety of computer architectures. The computer of FIGS. 10A and 10B are for purposes of illustration and not limitation of the present invention.

While this invention has been particularly shown and described with references to example embodiments thereof, it will be understood by those skilled in the art that various changes in form and details may be made therein without departing from the scope of the invention encompassed by the appended claims.

It should be understood that the block and flow diagrams may include more or fewer elements, be arranged differently, or be represented differently. It should be understood that implementation may dictate the block and flow diagrams and the number of block and flow diagrams illustrating the execution of embodiments of the invention.

It should be understood that elements of the block and flow diagrams described above may be implemented in software, hardware, or firmware. In addition, the elements of the block and flow diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A method for navigating a screen view of entities of differing entity types, the method comprising:
   determining an intention to navigate a subject entity based on a percentage of the screen view occupied by the subject entity; and
   as a function of the determined intention, selecting a navigation mode with which to navigate the subject entity, the selected navigation mode identifies the subject entity and provides a navigation behavior for navigating the subject entity.

2. The method of claim 1 wherein determining includes calculating the percentage of the screen view occupied by the subject entity from a modeled viewing distance and a dimension of a shape circumscribing the subject entity.

3. The method of claim 2 wherein the shape is one of a circle, polygon, sphere, parallelepiped, or regular geometry; and the dimension of the shape is an element that, at least in part, defines the shape mathematically.

4. The method of claim 2 wherein given the shape circumscribing the subject entity is a sphere and the dimension is a radius of the sphere, calculating the percentage includes calculating a percentage that is determinative of an intention to navigate the subject entity when a multiple of the radius of the sphere circumscribing the subject entity exceeds the modeled viewing distance.

5. The method of claim 1 wherein determining includes calculating the percentage of the screen view occupied by the subject entity from a modeled projection distance that determines the size of the screen view and the size of the subject entity in the screen view.

6. The method of claim 1 wherein selecting the navigation mode includes identifying to a user the subject entity separate and distinct from other entities of the screen view.

7. The method of claim 6 wherein identifying to the user the subject entity includes displaying in a manner that contrasts the subject entity from the other entities in the screen view.

8. The method of claim 6 wherein identifying to the user the subject entity includes removing the other entities from the screen view.

9. The method of claim 1 wherein selecting the navigation mode includes providing a user with the navigation behavior for navigating the subject entity while other entities of the screen view are unaffected by the provided navigation behavior.

10. The method of claim 1 wherein selecting the navigation mode includes switching to the navigation mode by: (i) changing from a previously navigated entity to the subject entity; and (ii) changing from a previous navigation behavior to the navigation behavior for navigating the subject entity.

11. The method of claim 1 wherein the screen view is of a planned process having a process entity and at least one product entity:

determining the intention includes determining a user's intention to navigate a process entity based on a percentage of the screen view occupied by the product entity; and selecting the navigation mode includes: (i) identifying to the user the product entity separate and distinct from the process entity and other product entities of the screen view of the planned process, and (ii) providing to the user a navigation behavior for navigating the product entity while the process entity and the other product entities of the screen view of the planned process are unaffected by the provided navigation behavior.

12. The method of claim 11 wherein selecting the navigation mode includes:

in an event the determined user's intention is to navigate a process entity, providing to the user a navigation behavior for navigating the process entity on a plane; and in an event the determined user's intention is to navigate a product entity, providing to the user a navigation behavior for navigating the product entity in a space.

13. The method of claim 12 wherein selecting the navigation mode includes:

in an event the determined user's intention is to navigate the city entity, providing to a user a navigation behavior for navigating the city entity at a bird's eye view; and in an event the determined user's intention is to navigate the building entity, providing to a user a navigation behavior for navigating the building entity at a street-level view.

14. The method of claim 1 wherein the screen view is of a mapped city having a city entity and at least one building entity:

determining the intention includes determining a user's intention to navigate a building entity based on a percentage of the screen view occupied by the building entity; and selecting the navigation mode includes: (i) identifying to the user the building entity separate and distinct from the city entity and other building entities of the screen view of the mapped city, and (ii) providing to the user a navigation behavior for navigating the building entity while the city entity and the other building entities of the screen view of the mapped city are unaffected by the provided navigation behavior.

15. An apparatus to navigate a screen view of entities of differing entity types, the apparatus comprising:

a determining unit to determine an intention to navigate a subject entity based on a percentage of the screen view occupied by the subject entity; and a selecting unit communicatively coupled to the determining unit to select, as a function of the determined intention, a navigation mode with which to navigate the subject entity, the selected navigation mode identifies the subject entity and provides a navigation behavior for navigating the subject entity.

16. The apparatus of claim 15 wherein the determining unit includes a calculating unit to calculate the percentage of the screen view occupied by the subject entity from a modeled viewing distance and a dimension of a shape circumscribing the subject entity.

17. The apparatus of claim 16 wherein the shape is one of a circle, polygon, sphere, parallelepiped, or regular geometry; and the dimension of the shape is an element that, at least in part, defines the shape mathematically.

18. The apparatus of claim 16 wherein given the shape circumscribing the subject entity is a sphere and the dimension is a radius of the sphere, the calculating unit calculates a percentage that is determinative of an intention to navigate the subject entity when a multiple of the radius of the sphere circumscribing the subject entity exceeds the modeled viewing distance.

19. The apparatus of claim 15 wherein the determining unit includes a calculating unit to calculate the percentage of the screen view occupied by the subject entity from a modeled projection distance that determines the size of the screen view and the size of the subject entity in the screen view.

20. The apparatus of claim 15 wherein the selecting unit includes an identifying unit to identity to a user the subject entity separate and distinct from other entities of the screen view.

21. The apparatus of claim 20 wherein the identifying unit includes a displaying unit to display in a manner that contrasts the subject entity from the other entities in the screen view.

22. The apparatus of claim 20 wherein the identifying unit includes a removing unit to remove the other entities from the screen view.

23. The apparatus of claim 15 wherein the selecting unit includes a unit to provide a user with the navigation behavior for navigating the subject entity while other entities of the screen view are unaffected by the provided navigation behavior.

24. The apparatus of claim 15 wherein the selecting unit includes a switching unit to switch the navigation mode by changing from a previously navigated entity to the subject entity and by changing from a previous navigation behavior to the navigation behavior for navigating the subject entity.

25. The apparatus of claim 15 wherein in a screen view of a planned process having a process entity and at least one product entity:

the determining unit determines a user's intention to navigate a process entity based on a percentage of the screen view occupied by the product entity; and the selecting unit (i) identifies to the user the product entity separate and distinct from the process entity and other product entities of the screen view of the planned process and (ii) provides to the user a navigation behavior for navigating the product entity while the process entity and the other product entities of the screen view of the planned process are unaffected by the provided navigation behavior.

26. The apparatus of claim 25 wherein the selecting unit:

in an event the determined user's intention is to navigate a process entity, provides to the user a navigation behavior for navigating the process entity on a plane; and in an event the determined user's intention is to navigate a product entity, provides to the user a navigation behavior for navigating the product entity in a space.

27. The apparatus of claim 15 wherein in a screen view of a mapped city having a city entity and at least one building entity:

the determining unit determines a user's intention to navigate a building entity based on a percentage of the screen view occupied by the building entity; and the selecting unit (i) identifies to the user the building entity separate and distinct from the city entity and other building entities of the screen view of the mapped city, and (ii) provides to the user a navigation behavior for navigating the building entity while the city entity and the other building entities of the screen view of the mapped city are unaffected by the provided navigation behavior.

28. The apparatus of claim 27 wherein the selecting unit:

in an event the determined user's intention is to navigate a city entity, provides to a user a navigation behavior for navigating the city entity at a bird's eye view; and in an event the determined user's intention is to navigate a building entity, provides to a user a navigation behavior for navigating the building entity at a street-level view.

29. A computer program product comprising a non-transitory computer readable medium having a computer readable program, wherein the computer readable program when executed on a computer causes the computer to:
   determine an intention to navigate a subject entity based on a percentage of the screen view occupied by the subject entity; and
   as a function of the determined intention, select a navigation mode with which to navigate the subject entity, the selected navigation mode identifies the subject entity and provides a navigation behavior for navigating the subject entity.

* * * * *